W. J. NEWMAN.
TRAP DOOR FOR DISCHARGE OPENINGS.
APPLICATION FILED AUG. 4, 1913.
1,143,852.   Patented June 22, 1915.
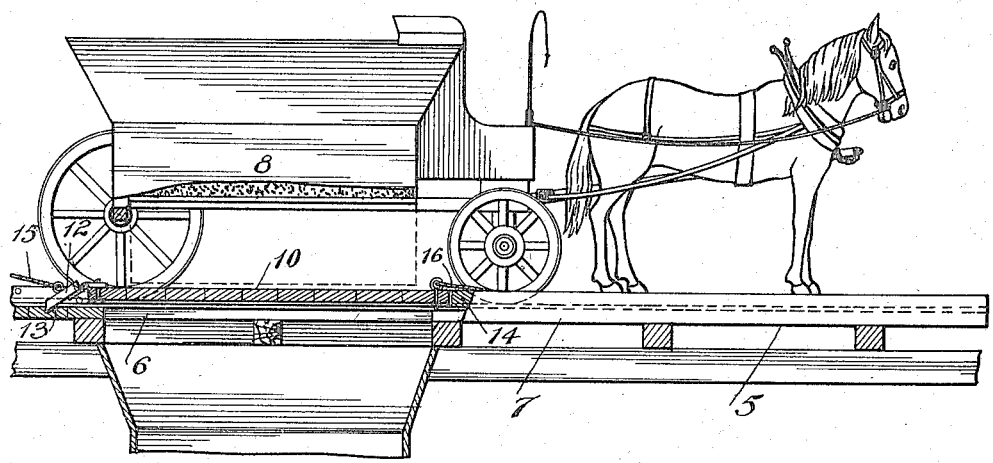
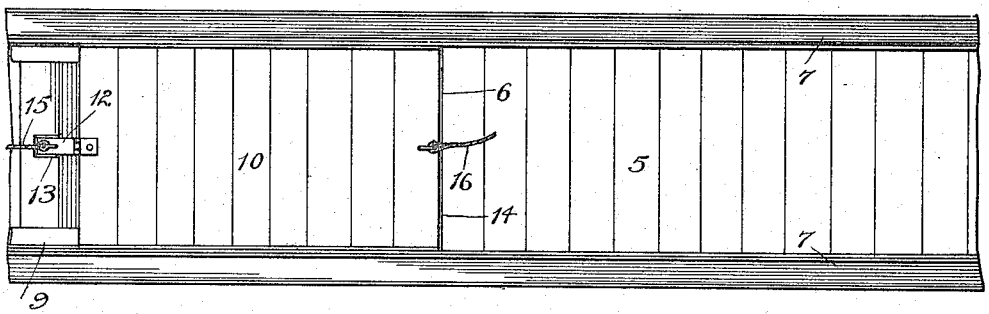
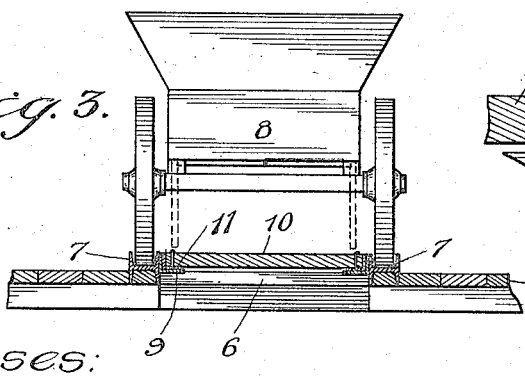
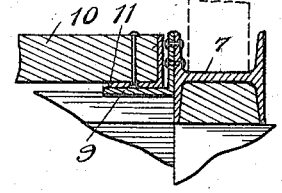
Witnesses:   Inventor
   William J. Newman
By Glenn S. Noble
   Atty.

UNITED STATES PATENT OFFICE.

WILLIAM J. NEWMAN, OF CHICAGO, ILLINOIS.

TRAP-DOOR FOR DISCHARGE-OPENINGS.

1,143,852. Specification of Letters Patent. Patented June 22, 1915.

Application filed August 4, 1913. Serial No. 782,927.

*To all whom it may concern:*

Be it known that I, WILLIAM J. NEWMAN, a citizen of the United States, residing at Chicago, in the county of Cook and State of Illinois, have invented certain new and useful Improvements in Trap-Doors for Discharge-Openings, of which the following is a specification.

In connection with disposal stations for dirt handling work, it is frequently desired to discharge dump wagons through an opening in a platform or the like. In such cases it is frequently necessary or convenient to provide a cover for the opening over which the team may be driven, such cover to be opened when the wagon is dumped. With ordinary forms of doors, the horses are apt to loosen or open the same and it frequently occurs that on this account, the horses will fall into the opening.

Among the objects of the present invention are to provide a safety door or cover for such an opening which will be positively locked when in closed position, to provide such a cover or door which may be opened and closed with as little difficulty as possible, and to combine such door or closure with a suitable track whereby the wagons will be brought to proper dumping position.

Other objects and advantages will appear from the following specification and the accompanying drawings in which:

Figure 1 is a side view of my improved device, partially in section, showing a wagon in dumping position prior to the opening of the door; Fig. 2 is a plan view of the track and door or closure; Fig. 3 is a sectional end view; Fig. 4 is an enlarged detail showing the construction of the track and door support or slideway.

In accordance with my invention, any suitable platform or runway 5, as indicated in drawings, is provided with an opening 6 through which the material is to be dumped. This opening is preferably made of about the same width as the wagon body and along the sides thereof I prefer to place I-beams 7, 7, or other suitable members to form a track for the wagon 8. These track members are spaced to the proper gage for the wagon wheels and the upwardly extending flanges will hold the wheels in alinement so that the wagon will be properly positioned over the opening 6. On the inner sides of the beams 7 are slideways 9 which extend the length of the opening 6 and a sufficient distance back to guide the door 10 when it is opened to the fullest extent. The door 10 is provided at the sides with angles 11 or other suitable members for slidable engagement with the angles forming the slideway 9. Such door may be constructed or formed in any desired manner so as to give it the proper strength for supporting the teams as they pass over the same. A pawl or lock 12 is hinged to the rear end of the door 10 and its free end is adapted to engage with a slot or recess 13 in the platform 5 whereby the door will be positively locked when in closed position. The front of the door strikes against a stop or abutment 14 when in closed position. A rope or cable 15 is attached to the pawl or lock 12 and a second rope or cable 16 is attached to the front end of the door.

When the team has been driven across the door 10 to the position indicated in Fig. 1, the operator pulls on the rope 15 which first releases the catch 12 and then draws the door back to uncover the discharge opening 6. After the load has been discharged and the team is about to be driven away, the operator takes a turn or two of the rope 14 around one of the axles of the wagon so that, by holding the free end of the rope, the team is caused to draw the door to closed position and as soon as the door is closed, he releases the free end thereby permitting the rope to unwind from the axle and the parts are in position for another load. While changes may be made in the construction and arrangement of some of the parts of this device to suit different conditions, I have found the arrangement shown in the drawings to be an exceedingly efficient and satisfactory one in actual practice. However, I do not wish to be limited to the exact construction for arrangement shown and described, except as specified in the following claims, in which—

I claim:

1. The combination with a platform or the like, having a discharge opening therethrough for dumping horse-drawn wagons, of a slidable door for said opening, said door forming a support over which the horses are driven, means for locking said door in closed position, means connected with said locking device for unlocking the door and drawing it to open position, and means adapted to coact with the wagon for drawing the door to closed position.

2. The combination with a platform or the like, having an opening therethrough for discharging material from horse drawn wagons, of a slidable door for said opening said door forming a cover over which the horses are driven, a pawl or lock at the rear end of said door for locking it in closed position, a rope secured to said pawl for releasing the pawl and pulling the door open and a second rope secured to said door for pulling the door to closed position.

3. The combination with a driveway for dumping wagons having beams for forming a track and having a discharge opening between said beams, of slideways secured to said beams, a door slidably mounted in said slideways, a lock for holding said door in closed position, a rope secured to said lock for unlocking the same and drawing the door open, and a second rope secured to said door and adapted to engage with a portion of a wagon for drawing the door to closed position.

4. The combination with a platform or the like, of beams for forming a track for wagons, a discharge opening between said beams, angles secured to the inner sides of said beams along said opening and somewhat beyond the same, a door slidably mounted on said angles, a locking pawl at one end of said door for engagement with a recess in the platform a rope secured to said pawl, and a rope secured to the opposite end of the door.

WILLIAM J. NEWMAN.

Witnesses:
F. P. VAUGHAN,
IRENE FORREST.

Copies of this patent may be obtained for five cents each, by addressing the "Commissioner of Patents, Washington, D. C."